United States Patent

[11] 3,557,881

| [72] | Inventors | James Franklin Sullivan<br>East Moline;<br>Loren Glenn Arnold, Rock Island; Howard<br>Christian Esbeck, Moline, Ill. |
|---|---|---|
| [21] | Appl. No. | 677,211 |
| [22] | Filed | Oct. 23, 1967 |
| [45] | Patented | Jan. 26, 1971 |
| [73] | Assignee | Deere & Company<br>Moline, Ill.<br>a corporation of Delaware<br>Continuation-in-part of application Ser. No.<br>579,652, Sept. 15, 1966, Patent No.<br>3,481,407. |

[54] OPENING-UP STOP LATCHING MECHANISM FOR MOLDBOARD PLOWS
11 Claims, 10 Drawing Figs.

[52] U.S. Cl.......................................................... 172/413,
172/418, 172/776
[51] Int. Cl................................................................ A01b 63/22
[50] Field of Search............................................ 172/400,
401, 413, 411, 487, 776, 418

[56] References Cited
UNITED STATES PATENTS

| 2,392,006 | 1/1946 | Silver | 172/413X |
| 2,669,818 | 2/1954 | Pursche | 172/413X |
| 2,704,021 | 3/1955 | Brundage | 172/413X |
| 2,780,158 | 2/1957 | Pursche | 172/413X |
| 2,777,373 | 1/1957 | Pursche | 172/413X |
| 2,979,140 | 4/1961 | McKenzie | 172/413X |
| 3,090,449 | 5/1963 | Ward | 172/413X |

FOREIGN PATENTS

| 77,590 | 8/1919 | Austria | 172/418 |
| 87,160 | 5/1966 | France. | |
| 258,626 | 5/1928 | Italy. | |

*Primary Examiner*—Robert E. Pulfrey
*Assistant Examiner*—Alan E. Kopecki
*Attorneys*—H. Vincent Harsha, Harold M. Knoth, William A. Murray and John M. Nolan ABSTRACT: An opening-up stop-latching mechanism for a plow having a frame mounted on a front furrow wheel for movement between a raised transport position and a lowered plowing position, the stop mechanism normally being biased to a normal plowing position, but movable to an opening-up position which is automatically disengaged by the movement of the frame from its lowered working position to its raised transport position.

INVENTORS.
JAMES F. SULLIVAN
LOREN G. ARNOLD
HOWARD C. ESBECK

BY

ATTORNEY

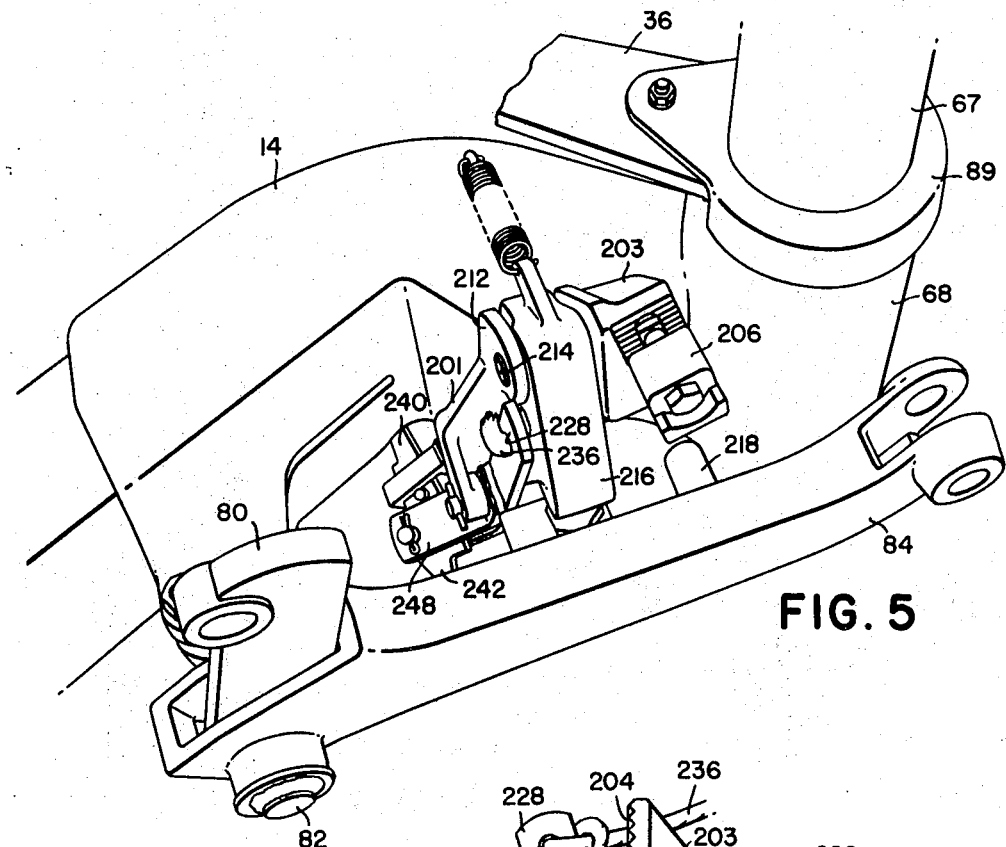
FIG. 5
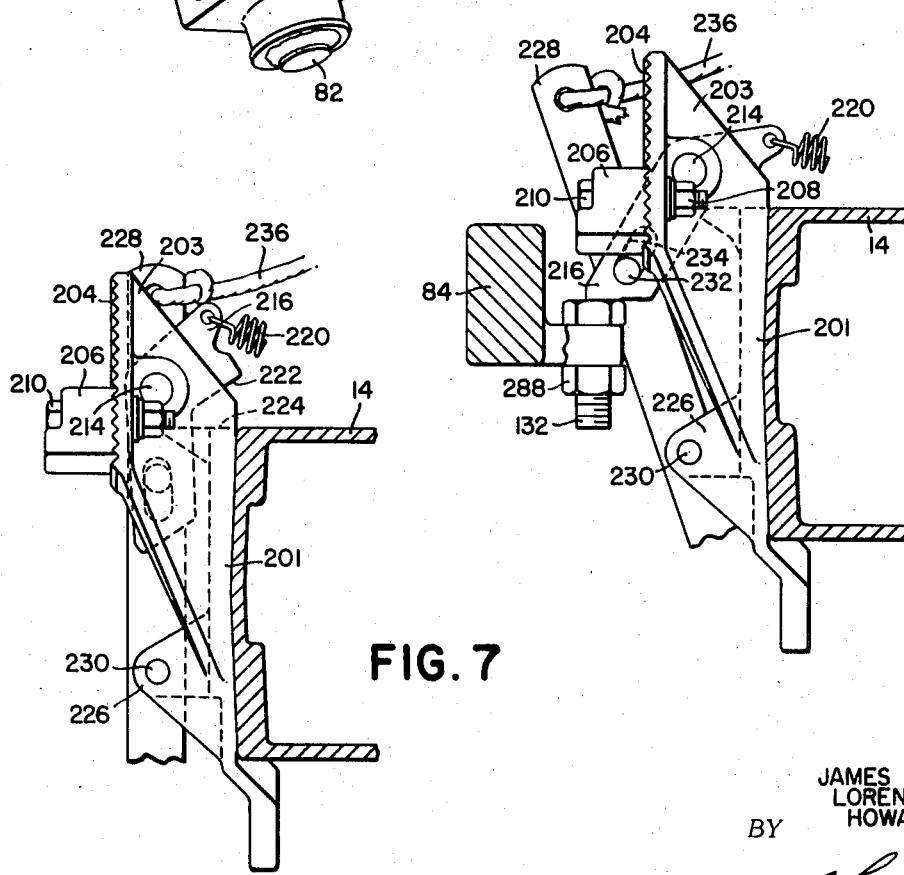
FIG. 6
FIG. 7
INVENTORS.
JAMES F. SULLIVAN
LOREN G. ARNOLD
HOWARD C. ESBECK
BY
ATTORNEY

INVENTORS.
JAMES F. SULLIVAN
LOREN G. ARNOLD
HOWARD C. ESBECK

BY John C. Thompson

ATTORNEY 3,557,881

OPENING-UP STOP LATCHING MECHANISM FOR MOLDBOARD PLOWS

CROSS REFERENCE TO RELATED APPLICATIONS

This application is a continuation-in-part of U. S. Pat. application Ser. No. 579,652 filed Sept. 15, 1966, now U.S. Pat. No. 3,481,407, entitled, "Plow."

FIELD OF THE INVENTION

The present invention relates generally to agricultural implements, and more particularly to moldboard plows having a main frame movable vertically on a front furrow wheel.

DESCRIPTION OF THE PRIOR ART

The present invention has particular application to either semimounted or drawn moldboard plows having a front furrow wheel. When plowing with this type of plow, it is necessary when first starting to plow the field to make what is called an opening-up pass or turn. During this pass, the front furrow wheel runs on the land. In subsequent passes, the front furrow wheel is then disposed in the furrow left from the opening-up pass. Because the front furrow wheel is lower during the subsequent passes, the plow will work at a greater depth if no adjustment is provided in the front furrow wheel. In the past, it has been customary to manually adjust the position of the plow frame on the front furrow wheel for the opening-up turn. This has been done for example, by turning a screw crank (such as the crank 122 shown in the U. S. Pat. No. 3,228,484 to Arnold issued Jan. 11, 1966) until the frame is disposed at a position normally lower than that used when the front furrow wheel can run in a furrow, the front plow bottoms then being disposed at the desired plowing depth. After the first pass has been made, the frame is then raised on the front furrow wheel and in subsequent passes, the plow bottoms will maintain the same plowing depth. This operation has been time consuming in that it is necessary for the operator of the plow to adjust the frame on the front furrow wheel both before and after the opening-up round is made.

SUMMARY OF THE INVENTION

It is an object of the present invention to provide in a moldboard plow having a front furrow wheel and means to selectively limit the vertical movement of the plow frame on the front wheel, whereby the plow bottoms can be lowered further when opening up a field.

A further object of this invention is to provide, in a plow having a front furrow wheel, structure selectively positioned to limit the vertical movement of the plow frame on the front furrow wheel to either a lowered normal plowing position or a lower opening-up plowing position, said structure being automatically positioned when the plow is moved from its plowing position to its transport position to limit subsequent downward movement of the frame to its lowered normal plowing position.

These and other objects and advantages of this invention will be apparent to those skilled in the art after a consideration of the following detailed description, taken in conjunction with the accompanying drawings in which the preferred form of this invention is illustrated.

BRIEF DESCRIPTION OF THE DRAWINGS

FIG. 5 is a view of the device shown in FIG. 4 taken from the top.

FIG. 6 is a view similar to FIG. 3 showing the device of FIGS. 4 and 5, the device being disposed in its normal plowing position.

FIG. 7 is a view similar to FIG. 6 showing the device in the opening-up position.

Figure 1:
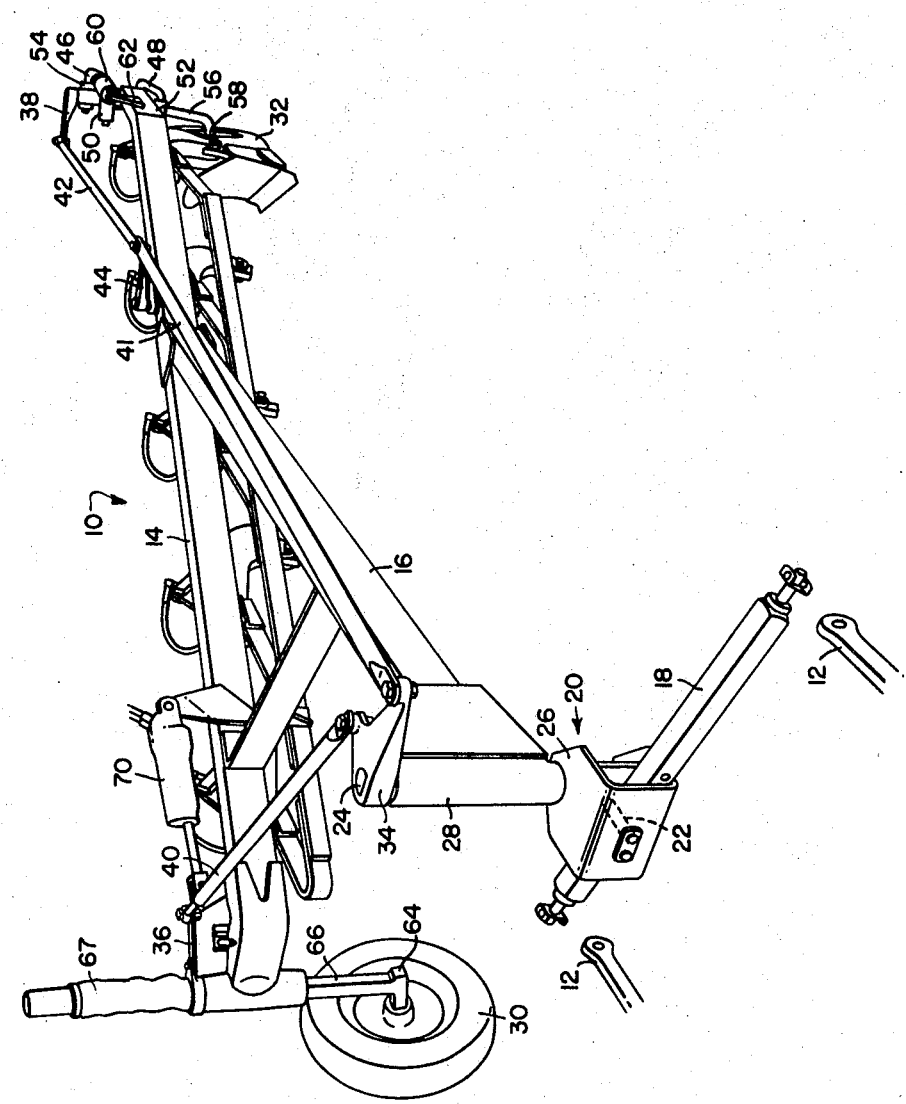
FIG. 1 is a perspective view taken from the front of a plow in which the principles of this invention have been incorporated.

In the following description right-hand and left-hand reference is determined by standing to the rear of the plow and facing the direction of travel.

DESCRIPTION OF THE PREFERRED EMBODIMENTS

One form of a plow in which the principles of this invention may be incorporated is shown at 10, the plow being adapted to be secured to a conventional farm tractor having lower draft links 12. The plow has an obliquely extending main frame 14 to which is secured a forwardly extending hitch 16. A crossbeam 18 is secured to the hitch 16 by means of a pivot housing 20, the crossbeam being pivotally secured to the housing 20 by means of a longitudinally extending pivot pin 22, and the housing in turn being secured to the hitch 16 by a pivot post 24 secured to the rear end 26 of the housing, the post being disposed within a sleeve 28 carried by the forward end of the hitch.

The plow is provided with front and rear furrow wheels 30, 32, respectively, the frame 14 being mounted on both of these wheels for vertical movement by means to be described later. The wheels are interconnected with the crossbeam 18 in such a manner that relative turning movement of the crossbeam 18 with respect to the hitch 16 will cause the wheels to be steered. To this end, a steering arm 34 is mounted on the upper end of the pivot post 24 and is in turn connected with front and rear steering arms 36, 38 carried by the mounting means for the front and rear wheels 30, 32 by means of a front steering link 40 and a two-piece rear steering link 41, 42 a midportion of the steering link 41, 42 being supported by a pivoted arm 44 carried by the main frame of the plow 14.

The main frame 14 is supported on the rear wheel 32 for vertical movement by upper and lower parallel arms 46, 48, respectively. The forward ends of the arms are secured to a casting 50 carried by a rearwardly extending portion 52 of the main frame 14. The rear ends of the arms are in turn secured to a casting 54 which has a sleeve portion in which is journaled the shaft 56. A stub axle 58, about which is rotatably journaled the wheel 32, is carried by the lower end of shaft 56. The rear wheel steering arm 38 is connected to the upper end of the shaft 56 and movement of the arm 38 will cause the wheel 32 to be steered. A cylinder 60 has its anchor end secured to a bracket 62 mounted on the rear end portion 52 of the main frame 14 and has its rod end secured to the upper arm 46. Extension and retraction of the cylinder 60 will cause the frame 14 to be raised and lowered.

Figure 2:
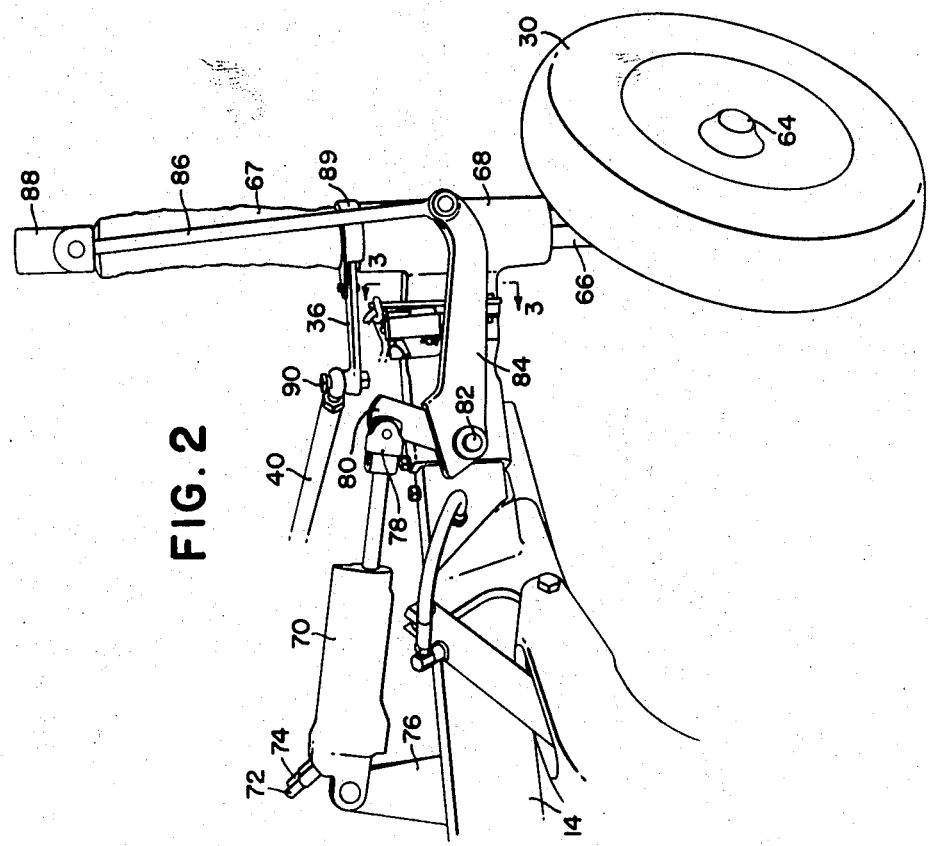
FIG. 2 is a perspective view of the front wheel assembly of the plow shown in FIG. 1 showing one form of stop device.

The front furrow wheel 30 is rotatably carried on a stub axle 64 rigidly secured to a vertically extending square shaft 66. The upper end of the shaft 66 is enclosed by a flexible protector 67, and, as can best be seen from FIG. 2, the square shaft 66 is slidably and rotatably disposed within sleeve 68 which is carried by the forward end of the main frame 14. To control vertical movement of sleeve 68 on the shaft 66, a double-acting hydraulic cylinder 70 is provided, this cylinder having inlet and outlet ports 72, 74. The anchor end of the cylinder 70 is pivotally secured to an anchor post 76 rigidly mounted on the frame 14. The remote end of the piston rod 78 is pivotally secured to a strap 80 which forms one end of a bell crank pivotally secured as at 82 to the frame of the plow. The other arm 84 of the crank is pivotally secured at its outer end to a vertically extending link 86, the upper end of which is pivotally secured to an outwardly extending arm 88 carried by the noncircular shaft 66.

The steering arm 36 is rigidly secured to the upper end of a bearing 89 on the sleeve 68, the bearing 89 being provided with a square aperture which slidably embraces shaft 66. The steering arm 36 is pivotally secured at its outer end by means of a pin 90 to the steering link 40, whereby, when the arm 36 is caused to be moved, the wheel 30 will be steered.

By using the particular structure described above for moving the frame 14 vertically on the wheel 30, the distance between the steering arms 24 and 36 remain constant, thus insuring the correct steering angle in all positions of vertical adjustment of the wheel 30.

The plow described above forms no part of the present invention and is more fully described in applicant's copending application Ser. No. 579,652.

It is a principle feature of this invention to provide a selectively operable stop which can contact the arm 84 of the bell crank to limit its movement in one direction. Thus, it should be noted that when the cylinder 70 is extended, the frame 14 is disposed in its transport position. When the cylinder is retracted until the arm 84 engages the stop 100 (shown in FIG. 3), the frame 14 will then assume its normal ground-working position.

As previously noted, it is necessary when first plowing a field to position the frame on the front furrow wheel at a lower position than when in the normal plowing position, since the wheel 30 will not have a previous furrow to run in. After one or two trips have been made through the field, the frame is then placed in its normal plowing position with respect to the wheel, which is higher than its opening-up position, since the wheel now has a furrow at the desired depth to run it. To permit the frame 14 to be moved to a first plowing (or opening-up) position, the stop 100 is moved to an inoperative position, permitting the cylinder 70 to retract further until the arm 84 contacts an abutment 102.

Figure 3:
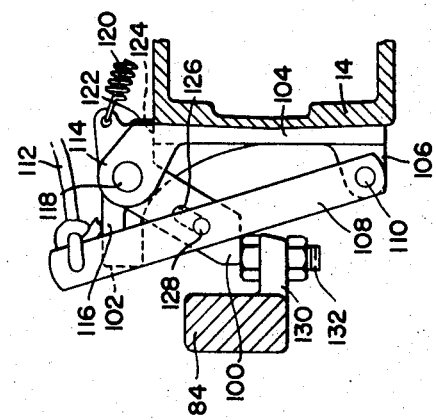
FIG. 3 is a section taken along the lines 3–3 in FIG. 2.
Figure 4:
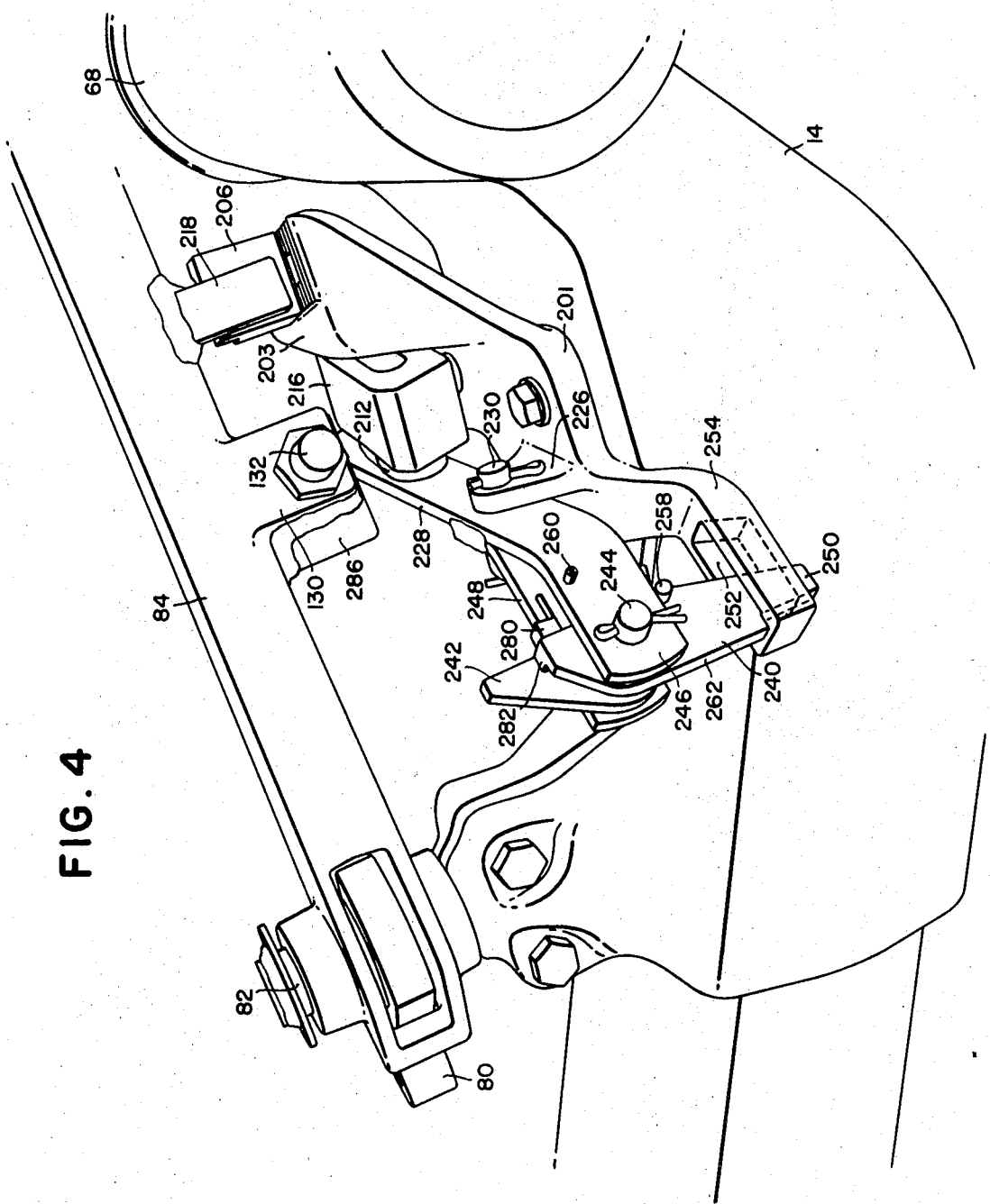
FIG. 4 is a perspective view of a modified stop device.
Figure 8:
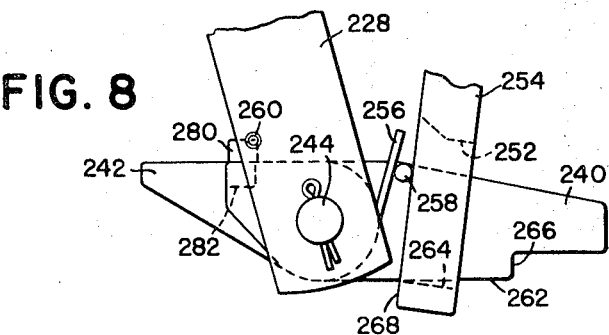
FIGS. 8 and 9 show the latch tongue and trigger of the modified stop device in the normal plowing position and the opening-up position, respectively.
Figure 9:
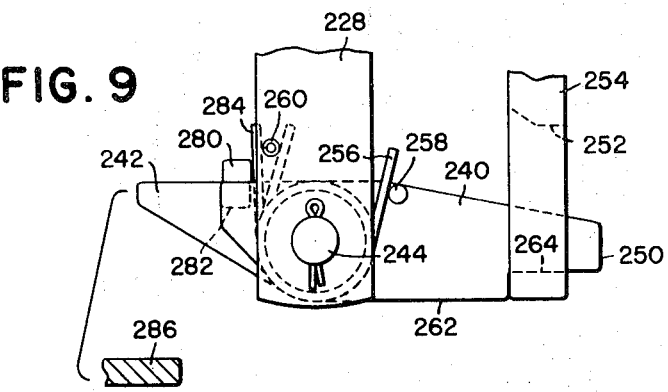
Figure 10:
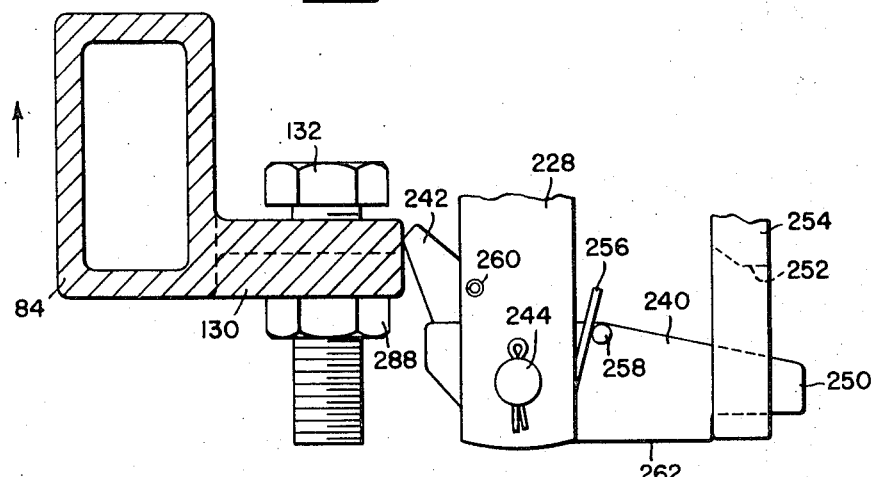
FIG. 10 is a view somewhat similar to FIG. 9 showing one arm of the bell crank moving upwardly past the trigger mechanism.

The stop construction shown in FIG. 3 includes a latch bracket 104 which is rigidly secured to the frame 14, the latch bracket 104 being provided with an outwardly extending apertured projection 106 at its lower end to which a strap 108 is pivotally secured by means of a pivot pin 110. The upper end of the strap 108 is apertured and receives a rope 112 which extends to the operator's station on the tractor. The stop or second abutment 100 is received between upper outwardly extending apertured portions 114 and 116, the last portion carrying the first abutment 102, the stop being pivotally secured thereto by means of a pivot pin 118. A tension spring 120 is secured at one end to an upper surface of the frame 14 and at the other end to an upper portion of the stop 100, the spring normally holding the lower end of the stop away from the frame 14 in such a position that an abutment portion 122 on an upper portion of the stop 100 will contact the upper end of the web 124 disposed between the portions 114 and 116. An elongated aperture or slot 126 is provided in an intermediate portion of the stop 100 and receives a pin 128 carried by an intermediate portion of the strap 108. The arm 84 carries a projecting member 130 which is apertured and receives a bolt 132, the head end of which contacts the bottom of the stop 100 when in a normal plowing position. However, to move the frame 14 into the opening-up position, it is only necessary to pull the rope 112 which will cause the stop 100 to move towards the frame 14 permitting the bolt and projecting members 132, 130, respectively, to pass the stop and thereby contact the abutment 102 which will dispose the frame 14 in its opening-up position.

In the design described above and illustrated in FIG. 3, it is necessary for the operator of the tractor to hold the rope 112 as the arm 84 moves from its lowered transport position to its raised working position. This is disadvantageous at times since the operator may also want to steer the tractor and control certain hydraulic functions as the plow is being lowered into its ground-working position. Therefore, an alternate design has been developed which permits the stop to be held in its inoperative position by an automatically operable latch, it therefore being only necessary for the operator to pull the rope 112 when the tractor is in its transport position to cause the stop to move to its inoperative position, the stop remaining in this position until the plow is moved from a lowered ground-working position to a raised transport position.

Referring now to FIGS. 4—10 in which the modified structure is illustrated, a mounting bracket 201 is provided on which the various parts of the stop device may be mounted, the bracket 201 being rigidly secured to a forward end of the main frame 14. The mounting bracket 201 is of a slightly different form than the bracket 104, and is provided with an upwardly outwardly extending apertured portion 203 which has a serrated surface 204. A first abutment, in the form of a block 206, having a corresponding serrated surface, is adjustably secured to the portion 203 by means of a nut 208 and bolt 210. A second portion 212 is also provided on the mounting bracket, the second portion 212 having an aperture in axial alignment with the aperture in the portion 203, there being a pivot pin 214 disposed within the aligned apertures and carrying a stop member or second abutment 216. The stop member can swing between its operative position shown in FIG. 6 in which the bolt 132 will engage the stop, or it may be swung to its inoperative position shown at FIG. 7 where a lug 218, cast on the arm 84 (FIG. 4), may engage the first abutment 206, this being the position the arm 84 assumes when in the opening-up position. One end of a tension spring 220 is secured to the stop member 216, the other end of the tension spring being connected to the frame 14. The spring will normally bias the stop member 216 to its engaging or operative position where the abutment surface 222 (FIG. 7) will contact the web 224 between the portions 203 and 212.

The mounting bracket 201 is provided with an intermediate outwardly extending apertured portion 226, an intermediate portion of a strap 228 being pivotally secured to the portion 226 by pivot pin 230. The strap 228 is interconnected with the stop member 216 by means of a pin 232 carried by the strap, one end of the pin being disposable within a slot 234 on the stop member 216. The strap can be swung from the position shown in FIG. 6 to the position shown in FIG. 7 merely by pulling on the rope 236. It should be observed at this point that the spring 220 will normally bias the strap 228 to the position shown in FIG. 6, the spring also biasing the stop member 216 to its operative position.

To hold the strap 228 and the stop 216 in the retracted inoperative position shown in FIG. 7, a latch mechanism is provided. This mechanism is best shown in FIGS. 4, 8, 9 and 10 and includes a latch tongue 240 and a trigger 242. Both the latch tongue 240 and trigger 242 are rotatably disposed about a pivot pin 244 carried by the lower end 246 of the strap 228 and an auxiliary member 248, whose upper end is welded to the strap. The end 250 of the latch tongue 240 remote from the pin 244 is disposed within an aperture 252 formed in the lower end portion 254 of the mounting bracket 201. The latch tongue is biased by a spring 256 disposed about the pin 244, one end of the spring contacting a projection 258 on the latch tongue 240, and the other end of the spring contacting a roll pin 260 carried by the lower end of the strap 228. The spring 256 will bias the inner end of the latch tongue downwardly so that the lower surface 262 is in sliding contact with the bottom surface 264 of the aperture 252. Since the strap 228 is normally biased towards the lower end portion 254 by the spring 220 acting through the pin 232, a notch 266 is provided which can contact the lower outer surface 268 of the portion 254.

When the rope 236 is pulled, the upper end of the strap 228 will move inwardly towards the frame 14 swinging the stop 216 from its operative position (FIG. 6) to its inoperative position (FIG. 7), at the same time swinging the lower end of the strap away from the lower end portion 254 of the mounting bracket 201. As the lower end of the strap moves away from the lower end portion 254, the latch tongue will be held in sliding contact with the bottom surface 264 of the aperture 252 until the tongue drops (FIG. 9), at which time releasing of the rope will cause the notch portion 266 to engage the surface 268. In this position, the stop 216 is held in its inoperative position.

To cause the notch on the latch tongue 240 to become disengaged, the trigger 242 is provided. As previously noted, the trigger 242 is journaled about the pin 244. The trigger is provided with a forwardly extending abutment surface 280 which can contact a rearwardly extending abutment surface 282 carried by the latch tongue 240. A spring 284 is disposed about the pin 244 with one end contacting the abutment 280 and the other end contacting the projection 258. (The projection 258 extends to both sides of the latch tongue 240 and the spring 256 contacts the projection 258 on its forward side and the spring 284 contacts the projection 258 on its rear side.) As can be seen, the trigger is thus normally biased to a position where the abutment 280 engages the abutment 282. However, the outwardly projecting portion of the trigger may swing upwardly to permit the lug 286 to move upwardly past the trigger 242 and latch tongue 240 without affecting the position of the latch tongue when it is in its latching position. The lug is formed on the projecting member 130 carried by the arm 84 and is adapted to contact the trigger as the arm 84 moves up or down when the strap 228 is held in the position shown in FIG. 9. As the arm moves up from its transport position shown in FIG. 9 to its raised working position, the lug 286 will swing the trigger clockwise as the arm passes the latch mechanism, this position being shown in FIG. 10. However, when the arm is then moved from its raised working position to its lowered transport position, the lower surface of the lug 286 will contact the upper surface of the trigger 242 and rotate the trigger in a counterclockwise direction. The rotation of the trigger in this direction will then cause the remote end of the latch tongue 250 to swing up disengaging the notch 266 from the surface 268, permitting the spring 220, acting through the pin 232 and slot 234 to swing the lower end of the strap into the normal plowing position shown in FIG. 8.

The block 206 is adjustable to provide for different opening depths. Thus it may be desirable to position the frame 14 different positions below the normal plowing position when opening a field, the particular height selected depending upon various conditions.

The bolt 132 is provided to adjust for different sizes of front furrow wheel, the bolt being moved into its desired position and then secured by a jam nut 288.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

We claim:

1. In a plow adapted to be pulled forwardly by a tractor, a main frame extending obliquely to the direction in which the plow is adapted to be pulled, front and rear furrow wheels, means mounting the main frame on the wheels for generally vertical movement between raised and lowered positions, stop means including a stop arm pivotally mounted on the main frame and moveable between operable and inoperable positions to selectively engage the means mounting the frame on the front wheel to selectively limit the downward movement of the main frame on the front wheel whereby the plow may be disposed in either an opening-up or normal working position, spring means normally biasing said stop arm toward its operable position, a strap pivotally secured at one end on said main frame, an intermediate portion of said strap engaging said stop arm, and a control means secured to the other end of the strap and operable from the tractor to cause said strap to pivot causing movement of said stop arm to its inoperative position.

2. The plow set forth in claim 13 in which the means mounting the frame on the front wheel means for generally vertical movement includes a vertically movable arm, and said stop arm selectively contacts the vertically movable arm to selectively limit its upward movement.

3. The plow set forth in claim 2 wherein a mounting bracket is secured to said main frame, the lower end of the mounting bracket pivotally receives said one end of the strap, the upper end of the mounting bracket pivotally receives said stop arm, and said mounting bracket is provided with abutment means which contacts the vertically movable arm when the main frame has moved to its opening-up position to thereby determine the opening-up position.

4. In combination with a plow having an obliquely extending main frame to which is secured a forwardly extending hitch and front and rear wheel means movable relative to the main frame to position the frame between a raised transport position and a lowered plowing position when the plow is secured to a tractor; a stop device mounted on the main frame and having first and second abutment portions engageable by said front wheel means to limit the downward movement of the frame on said first front wheel means to an opening-up position and a normal plowing position, respectively, said second abutment portion being movable between a first limiting position and a second inoperative position, latch means on said stop device to hold said second abutment portion in its inoperative position, disengaging means interconnected with said latch means and engageable by said front wheel means as the frame moves from its plowing position to its transport position to disengage said latch means, and biasing means engaging said second abutment portion to bias it towards its limiting position.

5. The combination set forth in claim 4 in which said latch means is carried by one end of a strap swingable between first and second positions, said strap being connected to said second abutment portion and operable when moved from its first to its second position to move the second abutment portion from its first limiting position to its second inoperative position, said latch means being operable to hold the strap in its second position.

6. The combination set forth in claim 5 wherein said latch means includes a swingable latch tongue movable between a first engaged position and a second disengaged position and has a portion engageable with structure fixed to the main frame when in the first position, spring means acting between said strap and latch tongue bias said swingable latch tongue towards said first position and is operable to cause said latch tongue to engage said structure when the strap is moved from its first to its second position, said disengaging means includes a pivoted trigger swingable in one direction away from said latch tongue, and engageable with the latch tongue when moved in the other direction to cause the latch tongue to move from its first engaged position to its second disengaged position, said strap is moved to its first position by said biasing means when the latch tongue is moved to its second position, and spring means normally bias said trigger into contact with said latch tongue.

7. The stop device set forth in claim 4 in which said first abutment is mounted for vertical adjustment whereby the opening-up position may be varied.

8. In combination with a plow having an obliquely extending main frame having front and rear wheel means movable relative to the main frame to shift the frame between a raised transport position and a lowered plowing position; a stop device mounted on the main frame and having first and second abutment portions engageable by said wheel means to limit the downward movement of the frame to an opening-up position and a normal plowing position, respectively, said stop device including a mounting bracket secured to said main frame, a strap mounted on said mounting bracket and movable between first and second positions, said second abutment portion being swingably secured to said mounting bracket and movable between a first outwardly extending limiting position and a second inward position, said second abutment portion being provided with a slot, a pin carried by said strap and disposable within said slot to cause said strap and said second abutment to move together between their first and second positions, a spring having one end secured to said second abutment and operable to bias the second abutment and the strap to their first position, latch means on said strap and engageable with said mounting bracket to hold said strap in its second position, and trigger means interconnected with said latch and operable when moved in one direction to disengage said latch.

9. The stop device set forth in claim 8 in which said wheel means includes a shaft member mounted for relative vertical movement with respect to and within a vertically extending sleeve carried by the main frame, a wheel being carried by the lower end of said shaft, and a bell crank mounted on the main frame, one arm of the bell crank being connected to said shaft member and the other arm being connected to an extensible and retractable force applying device mounted on the main frame, said one arm contacting said trigger means when said strap is in its second position.

10. In a plow adapted to be pulled forwardly by a tractor, a main frame extending obliquely to the direction in which the plow is adapted to be pulled, front and rear furrow wheels, means mounting the frame on the front and rear wheels for generally vertical movement relative thereto between raised and lowered position, a stop arm pivotally mounted on the main frame for movement between a first position in which it is engageable by the means mounting the frame on the front wheel to limit downward movement of the frame on the front wheel to a normal plowing position and a second position in which the means mounting the frame on the front furrow wheel bypasses the stop arm and the frame may move downwardly on the front wheel beyond the normal plowing position to an opening-up position, abutment means carried on the main frame and engageable by the means mounting the frame on the front wheel to determine the opening-up position, means normally biasing the stop arm to the first position, and means operable from the tractor to move the stop arm to the second position against the force of the biasing means.

11. In a plow adapted to be pulled forwardly by a tractor: a main frame extending obliquely to the direction in which the plow is adapted to be pulled; front and rear furrow wheels; means mounting the frame on the front and rear wheels for generally vertical movement relative thereto between raised and lowered positions; the means mounting the frame on the front furrow wheel including a shaft mounted for relative vertical movement with respect to and within a vertically extending sleeve carried by the main frame, the front furrow wheel being mounted on the lower end of the shaft, a bell crank mounted on the frame with one arm thereof operatively connected to the shaft and the other arm thereof being connected to one end of an extensible and retractable hydraulic force applying means having its other end mounted on the main frame; a stop arm pivotally mounted on the main frame for movement between a first position in which it is engageable by the bell crank to limit downward movement of the frame on the front wheel to a normal plowing position and a second position in which the bell crank bypasses the stop arm and the frame may move downwardly on the front wheel beyond the normal plowing position to an opening-up position, abutment means carried on the main frame and engageable by the bell crank to determine the opening-up position, means normally biasing the stop arm to the first position, and means operable from the tractor to move the stop arm to the second position against the force of the biasing means.

UNITED STATES PATENT OFFICE
CERTIFICATE OF CORRECTION

Patent No. 3,557,881          Dated 26 January 1971

Inventor(s) James F. Sullivan, Loren G. Arnold, Howard C. Est

It is certified that error appears in the above-identified patent and that said Letters Patent are hereby corrected as shown below:

Column 5, line 62, change "claim 13" to -- claim 1 --.

Column 7, line 12, change "position" to -- positions -

Signed and sealed this 18th day of May 1971.

(SEAL)
Attest:

EDWARD M. FLETCHER, JR.          WILLIAM E. SCHUYLER, J
Attesting Officer          Commissioner of Patent